United States Patent
Deremiah

(10) Patent No.: US 7,118,137 B2
(45) Date of Patent: Oct. 10, 2006

(54) TESTABLE PIPE JOINT

(75) Inventor: Richard E. Deremiah, Dayton, OH (US)

(73) Assignee: Price Brothers Company, Dayton, OH (US)

( * ) Notice: Subject to any disclaimer, the term of this patent is extended or adjusted under 35 U.S.C. 154(b) by 51 days.

(21) Appl. No.: 10/378,487

(22) Filed: Mar. 3, 2003

(65) Prior Publication Data

US 2004/0174015 A1 Sep. 9, 2004

(51) Int. Cl.
*F16L 37/00* (2006.01)
*F16L 33/18* (2006.01)
*G01M 3/08* (2006.01)

(52) U.S. Cl. .......... 285/93; 285/305; 285/321; 285/96; 285/351; 285/920; 73/49.1; 73/40.5 R

(58) Field of Classification Search ........ 285/305, 285/321, 93, 920, 96, 106, 351, 13, 14; 73/49.1
See application file for complete search history.

(56) References Cited

U.S. PATENT DOCUMENTS

| | | | | |
|---|---|---|---|---|
| 2,313,169 A | * | 3/1943 | Penick et al. | 285/123.6 |
| 2,319,543 A | * | 5/1943 | Hall | 277/619 |
| 2,350,867 A | * | 6/1944 | Bean et al. | 285/96 |
| 3,029,093 A | * | 4/1962 | Willis | 285/81 |
| 3,128,009 A | * | 4/1964 | Norton | 220/316 |
| 3,129,961 A | * | 4/1964 | Danko et al. | 285/230 |
| 3,177,019 A | | 4/1965 | Osweiler | 285/288 |
| 3,600,010 A | * | 8/1971 | Downs et al. | 285/96 |
| 3,776,576 A | | 12/1973 | Keyser | 285/27 |
| 3,860,270 A | * | 1/1975 | Arnold | 277/625 |
| 3,874,706 A | * | 4/1975 | Arnold | 285/24 |
| 3,884,511 A | * | 5/1975 | Hermanson | 285/93 |
| 3,899,920 A | * | 8/1975 | Matherne | 73/40.5 R |
| 4,116,044 A | * | 9/1978 | Garrett | 73/40.5 R |
| 4,124,231 A | * | 11/1978 | Ahlstone | 285/18 |
| 4,302,033 A | * | 11/1981 | Evans et al. | 285/14 |
| 4,431,218 A | * | 2/1984 | Paul et al. | 285/305 |
| 4,465,201 A | * | 8/1984 | Chalfant, Jr. | 220/582 |
| 4,478,438 A | * | 10/1984 | Elorriaga, Jr. | 285/276 |
| 4,479,669 A | * | 10/1984 | Hynes | 285/332.3 |
| 4,693,500 A | * | 9/1987 | Anderson | 285/94 |
| 4,850,622 A | * | 7/1989 | Suzuki | 285/288.1 |
| 5,004,274 A | | 4/1991 | Baas | 285/288 |
| 5,170,659 A | * | 12/1992 | Kemp | 73/46 |
| 5,226,682 A | * | 7/1993 | Marrison et al. | 285/308 |
| 5,364,131 A | * | 11/1994 | Hartsock et al. | 285/23 |
| 5,385,331 A | * | 1/1995 | Allread et al. | 251/149.1 |

(Continued)

FOREIGN PATENT DOCUMENTS

CA 2018369 6/1990

*Primary Examiner*—James M. Hewitt
(74) *Attorney, Agent, or Firm*—Wood, Herron & Evans, LLP

(57) ABSTRACT

A locking ring-type pipe joint has a spigot ring provided on a first pipe section, a bell ring provided on a second pipe section, and a locking ring that may be contracted to engage the spigot ring to the bell ring. First and second circumferential grooves formed in the spigot ring are configured to receive a test gasket and a pipe seal gasket respectively. An annular test space between the gaskets is in closed connection with a pressure port, whereby the pressure seal of the pipe seal gasket may be evaluated after the pipe sections are joined and prior to activating the joint restraint feature, installing the next pipe, and back-filling the pipe sections.

20 Claims, 4 Drawing Sheets

U.S. PATENT DOCUMENTS

| | | | | |
|---|---|---|---|---|
| 5,419,594 A | * | 5/1995 | Nelms | 285/315 |
| 5,498,042 A | * | 3/1996 | Dole | 285/148.27 |
| 5,718,459 A | * | 2/1998 | Davie et al. | 285/148.19 |
| 5,746,453 A | * | 5/1998 | Roberts | 285/47 |
| 5,845,944 A | * | 12/1998 | Enger et al. | 285/23 |
| 5,876,071 A | * | 3/1999 | Aldridge | 285/321 |

* cited by examiner

TESTABLE PIPE JOINT

FIELD OF THE INVENTION

The present invention pertains to piping systems, and more particularly to a pipe joint which can be tested for sealing integrity during assembly of the piping system and then locked into position by mechanical means to prevent future separation of the joint.

BACKGROUND OF THE INVENTION

Piping systems, including piping systems comprising concrete pipe, have been used to supply and dispose of water, sewage, and similar fluids. The pipe may be of steel, concrete, or other construction materials. Such piping systems are typically buried underground and may traverse many miles. Accordingly, it is important to prevent the leakage of fluids from the pipe. In many instances, fluid is pumped through the pipe, therefore the pipe may be subjected to high pressures. However, even if the fluid is not pumped, it is desirable to have leak-free pipe to avoid loss or contamination of the fluid being conveyed or contamination of areas surrounding the pipe.

Piping systems are susceptible to leakage at joints when the joints are improperly assembled or adjacent sections of pipe are subjected to thrust forces that are sufficient to separate the adjacent pipe sections. These thrust forces are caused by directional changes in alignment of the pipeline, by obstructions to flow such as bulkheads or closed valves, or by changes in size of the pipe. While it is important to prevent such joint separation, it is noted that some-flexibility between adjacent pipe sections is desirable to facilitate the installation and assembly of the piping system and to accommodate minor movement of pipe sections during use. To accomplish the objective of preventing joint separation while permitting some degree of flexibility, various restrained joints have been developed. A particular type of restrained joint is disclosed in U.S. Pat. Nos. 3,177,019; 3,776,576; and 5,004,274, each assigned to the assignee of the present invention and hereby incorporated by reference in their entirety. Each of these patents disclose restrained joints wherein a steel locking ring is provided in a first pipe section and may be contracted to engage a corresponding recess formed into an adjacent pipe section. This type of pipe joint has particular advantages that facilitate the quick and efficient assembly of the joint restraining mechanism.

Because piping systems for supplying and disposing of water and other fluids are typically buried beneath the ground, it is important to ensure that the pipe joints are adequately sealed prior to restraining the joint and back-filling over the buried pipe. This is particularly important when structures such as roads or buildings will be constructed above the buried pipe prior to a pressure test of the completed pipeline. Without the ability to pressure test the seal of each joint as it is installed, testing the joint seals has included the use of feeler gauges or ultrasonic devices for checking the position of the gasket and then filling the completed pipeline with water, applying pressure and watching for a drop in pressure or other evidence of leakage. This method of verifying the joint seals results in the need to find where any indicated leakage is originating, uncovering the pipe at leakage site(s), installing the necessary leak repair procedure, and re-testing the entire line. Each of these steps can be very time consuming and expensive due to the buried condition of the line.

Another method of testing pipe joints has involved pressurizing an annular space in the pipe joint, adjacent the pipe sealing gasket, with air or water. To utilize this method, the pipe must be manufactured to have a closed annular space adjacent the sealing gasket, and a means to introduce a source of pressurized air or water. Advantageously, each joint may be tested prior to back-filling allowing any leakage of the joint seal to be detected and fixed prior to installation of the next pipe. This method may be used to test the joint between adjacent pipe sections from an access port located inside the pipe, when persons are permitted inside the pipe. When conditions prevent access of personnel inside the pipe, an access port coupled to the test section may be provided on the exterior of the pipe.

Therefore, a need has been noted for a pipe joint that both accommodates thrust forces while also providing assurance of the pressure seal integrity of each pipe joint in a pipeline prior to activation of an efficient restraining mechanism, installation of the next piece of pipe, and burying of the pipeline.

SUMMARY OF THE INVENTION

The present invention provides a testable restrained pipe joint for joining first and second pipe sections that permits testing of the sealing integrity of the pipe joint prior to restraining the joint, installing additional pieces of pipe and back-filling. In an exemplary embodiment, the pipe joint includes a spigot ring on the first pipe section and a bell ring on the second pipe section. The bell ring has a locking ring that can be contracted to engage the bell ring to the spigot ring. The spigot ring has two circumferential grooves formed in its exterior surface for receiving a test gasket and a pipe seal gasket, respectively. A pressure port formed in the spigot ring provides fluid access to the annular space between the test gasket and the pipe seal gasket, whereby the integrity of the joint seal may be tested by pressurizing the annular space with air or water.

In one aspect of the invention, the pressure port is accessible from a location interior to the pipe joint. Accordingly, testing of pipe sections according to this embodiment may be accomplished by personnel from inside the laid pipe. This embodiment is suited for use with pipe sections having interior diameters large enough to permit personnel to enter the pipe when safety regulations permit such personnel entry.

In another aspect of the invention, the pressure port is provided at a location exterior to the pipe joint. This embodiment is suited for use with pipe sections having interior diameters too small to safely accommodate personnel within the pipe. The pressure port is directly connected with the enclosed annular space between the two gaskets in the spigot ring groove.

In yet another aspect of the invention, a method of testing a pipe assembly having first and second pipe sections coupled together by a spigot ring, a bell ring, and a locking ring for engaging the bell ring to the spigot ring includes coupling a pressure source to a pressure port on the spigot ring, pressurizing an annular space between gaskets on the spigot ring, and monitoring the pressure.

The features and objectives of the present invention will become more readily apparent from the following Detailed Description taken in conjunction with the accompanying drawings.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION

Figure 1:
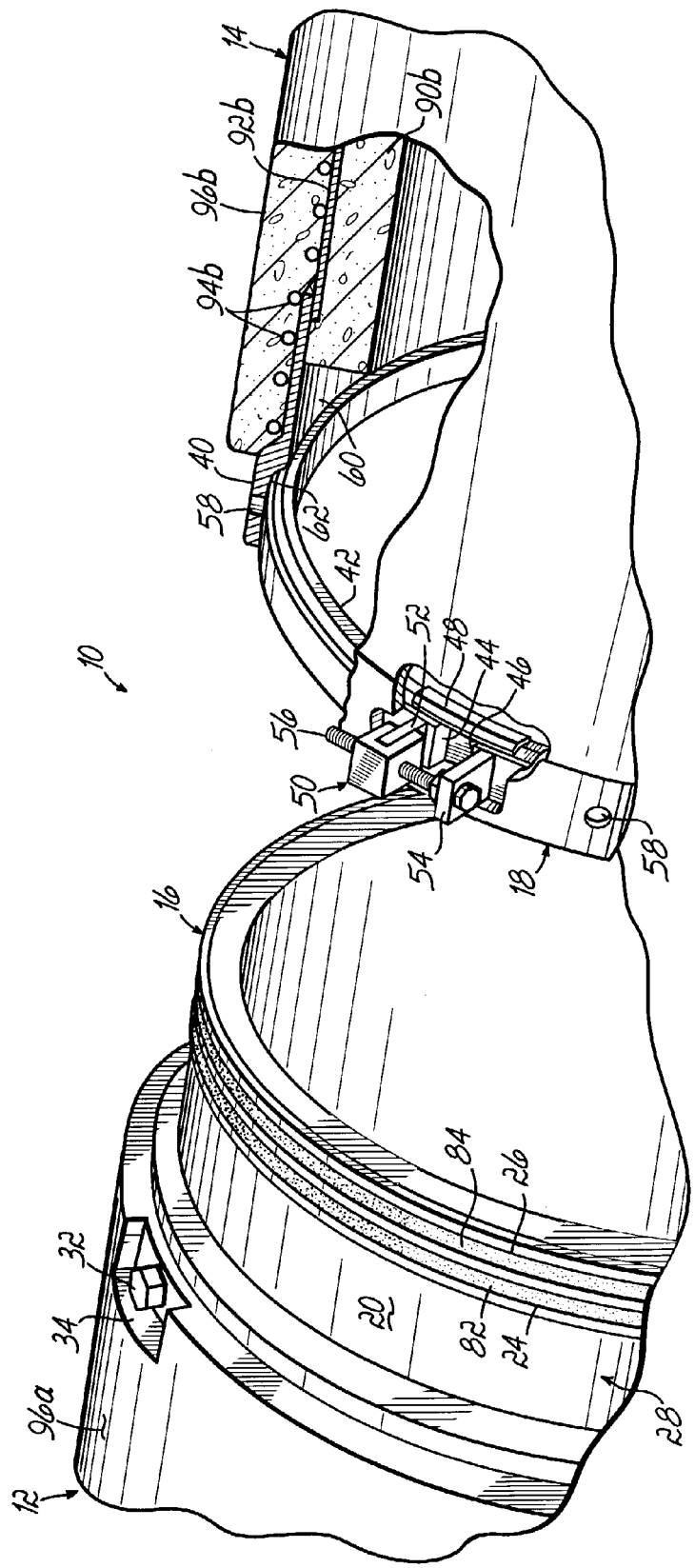
FIG. 1 is a partial perspective view depicting a testable locking ring type pipe joint of the present invention.
Figure 2A:
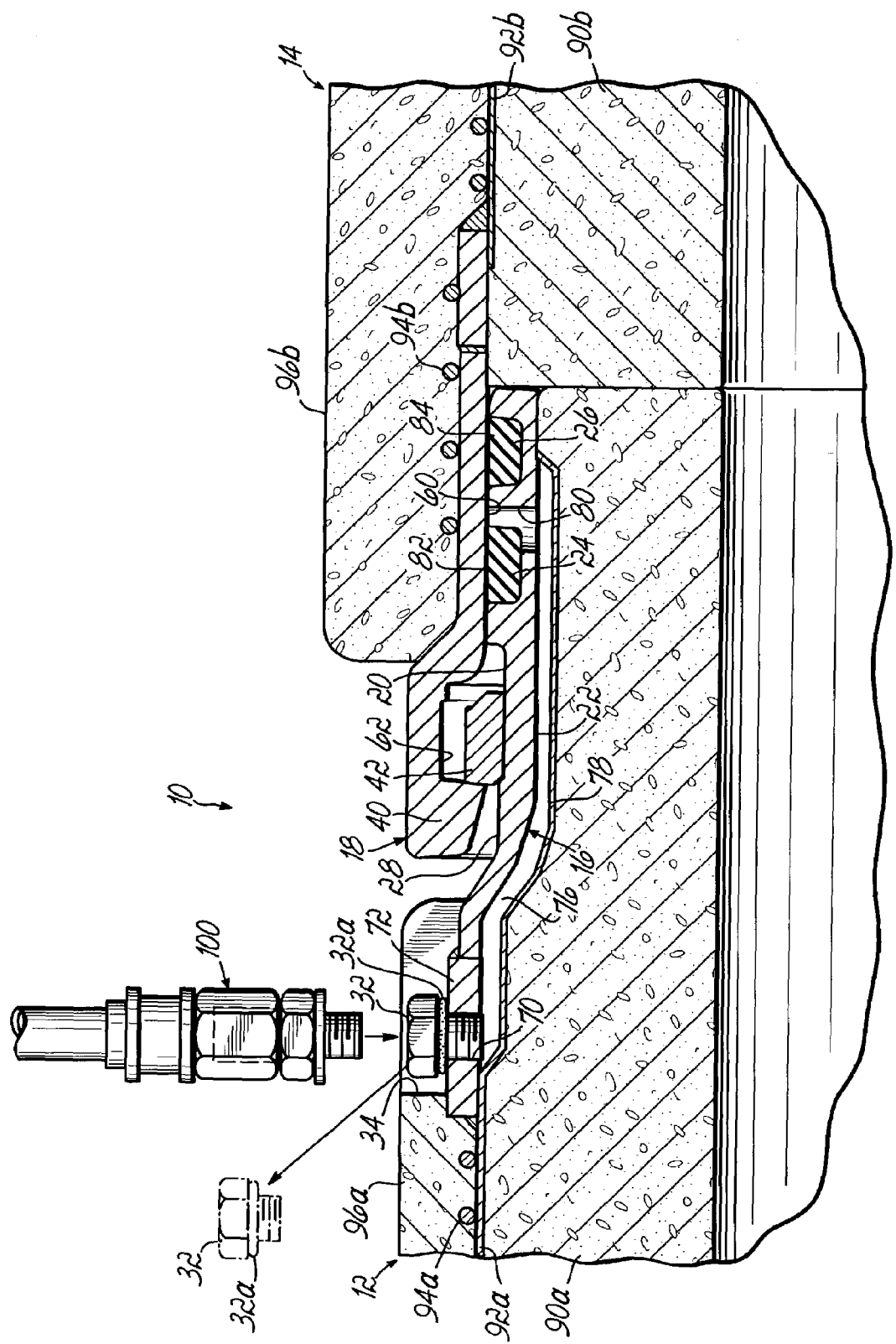
FIGS. 2A–2B are partial cross-sectional views of the pipe joint of FIG. 1 illustrating an externally testable joint.

Referring to FIGS. 1 and 2A, there is shown an exemplary testable pipe joint 10 of the present invention. The pipe joint 10 comprises first and second pipe sections 12, 14 which may be joined together at their respective ends along with other similar pipe sections to form a pipeline. The pipes 12, 14 are depicted herein as prestressed concrete pressure pipes having concrete cores and steel cylinders that are wound by pre-stressing steel wires, but it will be recognized that the pipe may be of other configurations and materials used for pipelines, such as steel, reinforced concrete or ductile iron. The first pipe section 12 includes a spigot ring 16 and the second pipe section 14 includes a bell ring 18 adapted to receive the spigot ring 16 of the first pipe section 12, as disclosed in U.S. Pat. No. 5,004,274, herein incorporated by reference in its entirety. The spigot ring has an exterior surface 20 and an interior surface 22 (shown in FIG. 2A). First and second circumferential grooves 24, 26 are formed in the exterior surface 20 of the spigot ring 16 proximate the distal end of the spigot ring 16 and are configured to receive annular, o-ring type gaskets as disclosed in U.S. Pat. No. 5,004,274. Spigot ring 16 further includes a reduced diameter area 28 formed in the exterior surface 20 inboard of the distal end of the spigot ring 16 and behind the first and second circumferential grooves 24, 26. In the exemplary embodiment shown in FIG. 1, the first pipe section 12 further includes a plug 32 for sealing a pressure port that facilitates testing the assembled pipe joint 10, as will be discussed in more detail below. A pocket 34 is formed into an outer mortar coating 96a of the first pipe 12 to permit access to the plug 32 when setting up to test the assembled pipe joint 10.

With continued reference to FIGS. 1 and 2A, the bell ring 18 provided on the second pipe section 14 includes a flared distal end 40 which is sized to slide over the spigot ring 16 on the first pipe section 12 to form the pipe joint 10. The bell ring 18 includes a locking ring 42 which is split to permit expansion or contraction of the locking ring 42, as described in U.S. Pat. No. 5,004,274. Spaced first and second opposing ends 44, 46 of the locking ring 42 are surrounded by a clip 48 that facilitates engagement of the spigot ring 16 within the bell ring 18 without damaging gaskets 82, 84 which are fitted on the spigot ring 16. The spacing between the first and second opposed ends 44, 46 of the locking ring 42 may be adjusted by a bolt and U-nut assembly 50, 56 to expand or contract the locking ring 42. Locking ring assembly 42 includes a first lug 52 provided on the first end 44 of the locking ring 42 and a second lug 54 provided on the second end 46 of the locking ring 42. The first and second lugs 52, 54 are coupled by a fastener 56 whereby tightening of the fastener 56 reduces the space between the first and second ends 44, 46 to thereby contract the locking ring 42. Advantageously, the locking ring 42 and the thin metal clip 48 permit the bell ring 18 to slide over the gaskets 82, 84 in the spigot ring 16 when the locking ring 42 is in an expanded state, whereafter the fastener 56 may be tightened to place locking ring 42 in a contracted state to engage the spigot ring 16 about the reduced diameter area 28.

Prior to assembly of the pipe joint 10, a test gasket 82 is fitted into the first circumferential groove 24 and a pipe seal gasket 84 is fitted into the second circumferential groove 26. As the spigot ring 16 is inserted into the bell ring 18, the test gasket 82 and pipe seal gasket 84 are compressed against the interior surface 60 of the bell ring 18 to thereby seal the pipe joint 10. Advantageously, the two gaskets 82, 84 create an annular joint test area between the first and second circumferential grooves 24, 26 whereby the integrity of the pipe seal gasket 84 may be tested, as will be discussed below. The test gasket 82 completes the seal of the annular test section with respect to the exterior of the pipe sections 12, 14 and may be formed from the same material as pipe seal gasket 84. The test gasket 82 is only needed to test the integrity of the pipe joint 10 during initial assembly, whereafter sealing of the pipe joint is accommodated by the pipe seal gasket 84. Accordingly, the test gasket 82 may alternatively be formed from material other than that used for pipe seal gasket 84, including material adapted to disintegrate or dissolve after installation is complete.

The construction of the first and second pipe sections 12, 14 as pieces of prestressed concrete cylinder pipe is illustrated more clearly in FIG. 2A wherein the pipe sections include concrete cores 90a, 90b, steel cylinders 92a, 92b wound by pre-stressed steel wires 94a, 94b and outer mortar coatings 96a, 96b. Locking ring 42 is disposed within a circumferential groove 62 formed in the interior surface 60 of bell ring 18. As shown in FIG. 1, bell ring 18 further includes holes 58 spaced circumferentially around the end of the bell ring 40 to permit grout to be placed within the assembled joint 10 after the locking ring 42 has been contracted to engage the spigot ring 16.

Referring now to FIG. 2A, the fully assembled joint 10 is shown in more detail. Spigot ring 16 has been inserted within the interior of bell ring 18 and locking ring 42 is shown in the contracted state to engage reduced diameter area 28 of the spigot ring 16. A pressure port 70 is formed into a second end 72 of the spigot ring 16, opposite the distal end containing the first and second grooves 24, 26. The pressure port 70 is in fluid communication with the first and second circumferential grooves 24, 26 via a conduit 76 disposed between the pressure port 70 and the circumferential grooves 24, 26. In the exemplary embodiment shown, the conduit 76 comprises a steel channel section 78 extending axially along the inner surface 22 of the spigot ring 16. An aperture 80 is formed into the spigot ring 16 adjacent to the first circumferential groove 24 to connect the conduit 76 to the annular test section between the two gaskets 82, 84.

Figure 2B:
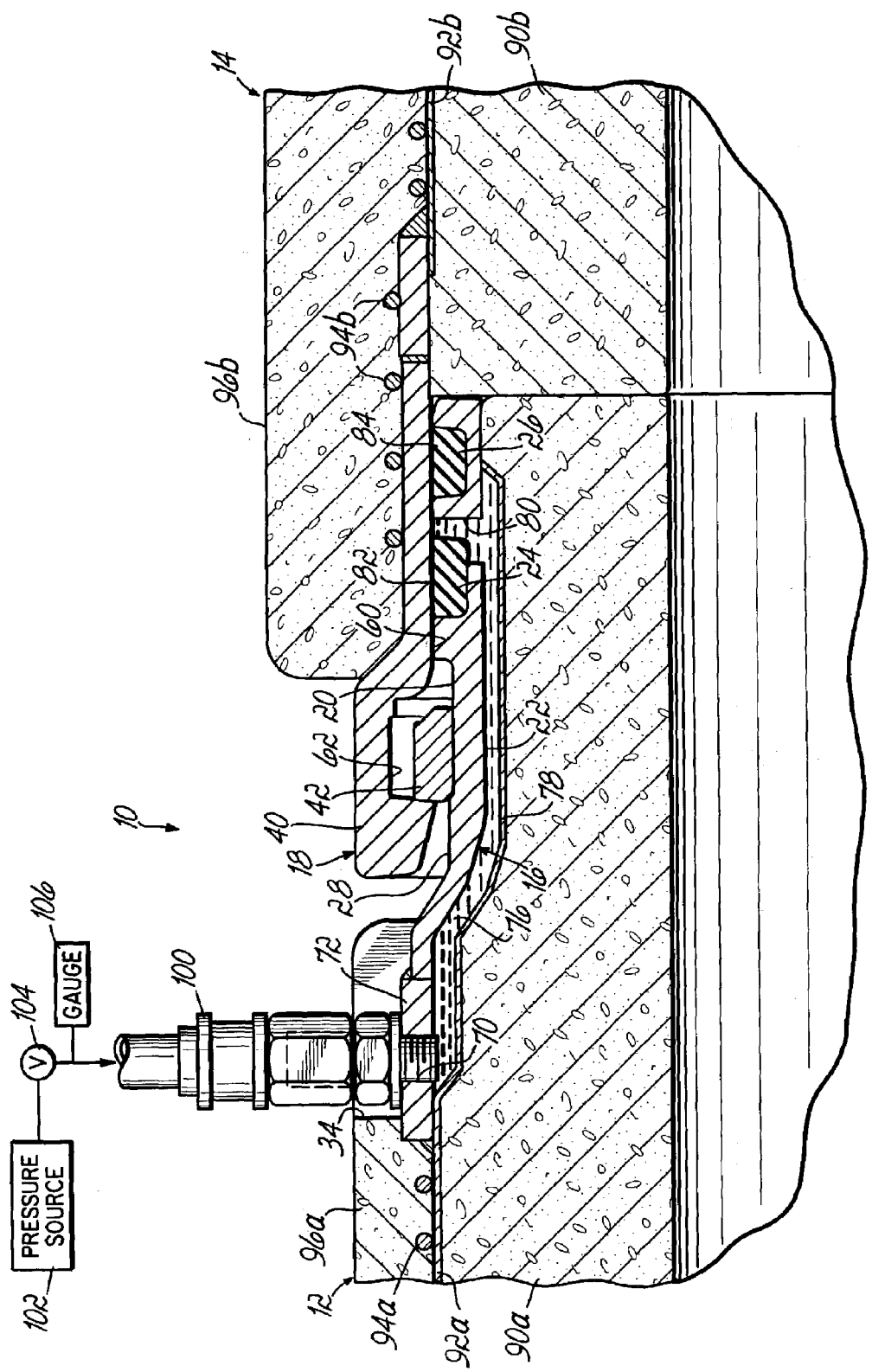

With reference to FIGS. 2A and 2B, use of the testable pipe joint 10 will now be described to test pipe seal gasket 84. To test the integrity of the pipe joint 10, the plug 32 and its sealing gasket 32a are removed from the pressure port 70 and replaced with a test fitting 100. The test fitting 100 is connected to a source of pressurized air or water 102. Once the fitting 100 has been secured to the spigot ring 16 at pressure port 70, pressurized air or water may be forced into the annular test space between the two gaskets 82, 84 through the conduit 76 and aperture 80. Once a desired pressure has been obtained, a valve 104, disposed between port 70 and the pressure source 102, is closed and the pressure monitored with a pressure gauge 106 to ensure adequate sealing of the pipe joint 10 by the pipe seal gasket 84. If the joint 10 is determined to be adequately sealed, the air or water used to pressurize the first circumferential groove 24 may be evacuated and the seal plug 32 with its sealing gasket 32a reinstalled in pressure port 70. Thereafter, cement grout (not shown) may be used to encase the exposed exterior surfaces of the joint as known in the art. The exemplary embodiment described above provides an externally testable joint 10 which may be utilized to quickly and efficiently test the pressure seal of an assembled pipe joint 10 from a location external to the pipe sections 12, 14. This is advantageous when access to the interior of the pipe by personnel is hindered due to the small interior diameter of the pipe or by safety regulations.

Figure 3:
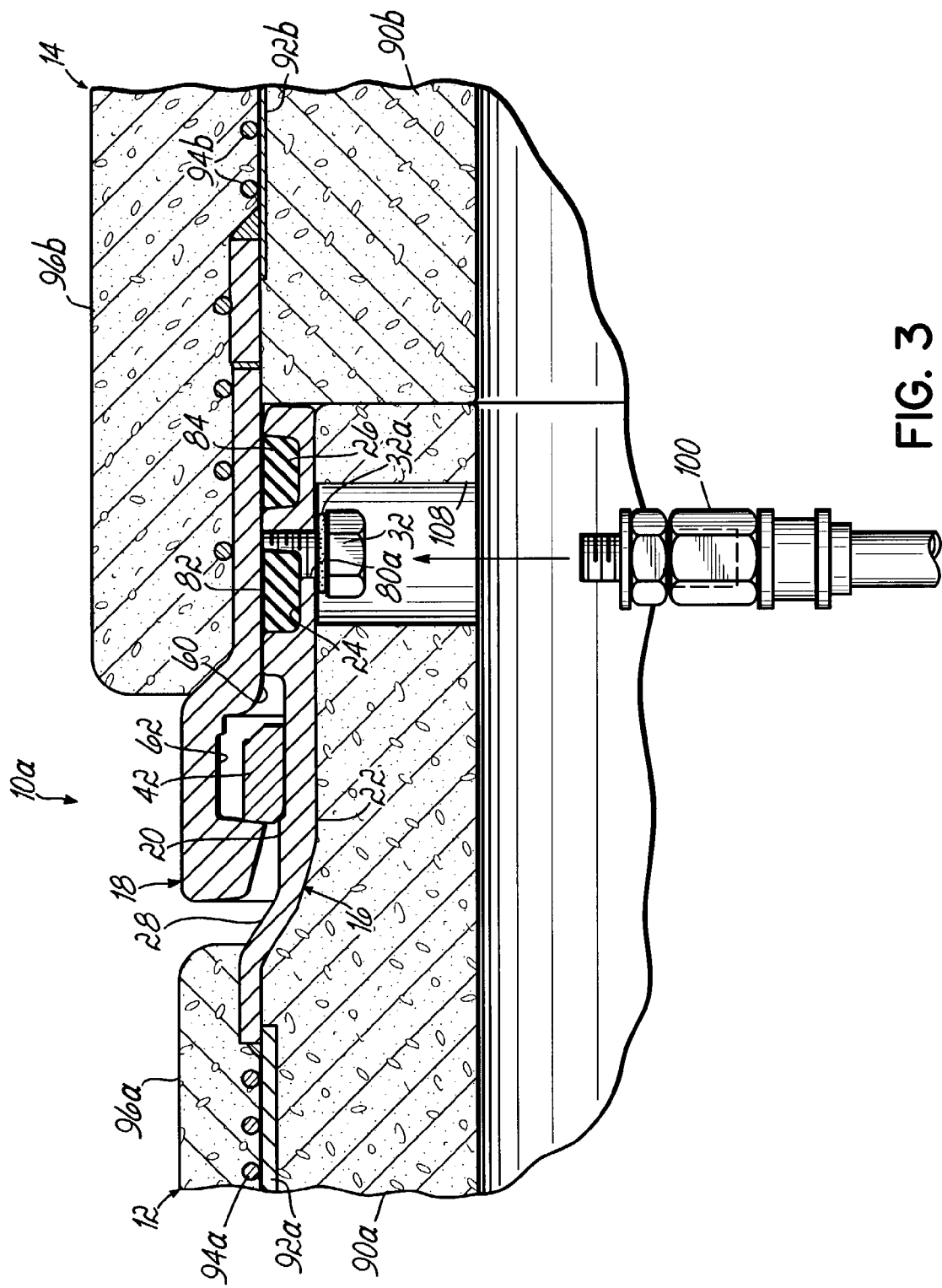
FIG. 3 is a partial cross-sectional view of a pipe joint similar to that shown in FIGS. 2A–2B, and illustrating an internally testable pipe joint.

Referring now to FIG. 3, there is shown another exemplary embodiment of a pipe joint 10a similar to that shown in FIGS. 2A–2B, but having a pressure port which is accessible from the interior of the pipe. Such a configuration is useful when access by personnel to the interior of the pipe is allowed. In the exemplary embodiment shown, like components of the first and second pipe sections 12a, 14 have been similarly numbered. In this embodiment, the aperture 80a includes internal threads whereby the aperture 80a may serve as an internal pressure port. Accordingly, the need for the conduit shown in FIGS. 2A–2B is eliminated. The first pipe section 12a further includes a recess 108 formed into the concrete core 90a or other lining of the spigot 22 to permit access to the internal pressure port 80a. To test the pipe joint 10a, a seal plug 32 and its sealing gasket 32a are removed from the pressure port 80a and a test fitting 100 is installed as described above. The annular test section between the two gaskets 82, 84 may then be filled with pressurized air or water to test the joint 10a, as described above.

While the present invention has been illustrated by the description of the various embodiments thereof, and while the embodiments have been described in considerable detail, it is not intended to restrict or in any way limit the scope of the appended claims to such detail. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of the general inventive concept.

What is claimed is:

1. A testable pipe joint for coupling first and second pipe sections of a pipe system, comprising:
   a spigot ring for use with the first pipe section, the spigot ring having an exterior surface and an interior surface;
   a first circumferential groove formed in said exterior surface of said spigot ring for receiving a test gasket;
   at least one second circumferential groove formed in said exterior surface of said spigot ring for receiving a pipe seal gasket;
   a bell ring for use with the second pipe section and configured to engage said spigot ring, said bell ring having an interior surface sized to receive at least a portion of said spigot ring, said interior surface of said bell ring including a circumferential groove;
   a locking ring disposed within said circumferential groove of said bell ring and having a diameter adjustable between an expanded state and a contracted state, wherein said locking ring accommodates engagement of said spigot ring and said bell ring in said expanded state, and wherein said locking ring clamps said bell ring and said spigot ring in said contracted state, said locking ring having first and second ends selectively adjustable between said expanded and contracted states by a fastener, said fastener operatively securing said first and second ends of said locking ring;
   a test gasket disposed within said first circumferential groove of said spigot ring;
   a pipe seal gasket disposed within said second circumferential groove of said spigot ring, said test gasket and said pipe seal gasket defining an annular space therebetween; and
   a pressure port in fluid communication with said annular space between said test gasket and said pipe seal gasket.

2. The testable joint of claim 1, wherein said pressure port is accessible from said interior surface of said spigot ring.

3. A testable pipe joint for coupling first and second pipe sections of a pipe system, comprising:
   a spigot ring for use with the first pipe section, the spigot ring having an exterior surface and an interior surface;
   a first circumferential groove formed in said exterior surface of said spigot ring for receiving a test gasket;
   at least one second circumferential groove formed in said exterior surface of said spigot ring for receiving a pipe seal gasket;
   a bell ring for use with the second pipe section and configured to engage said spigot ring, said bell ring having an interior surface sized to receive at least a portion of said spigot ring, said interior surface of said bell ring including a circumferential groove;
   a locking ring disposed within said circumferential groove of said bell ring and having a diameter adjustable between an expanded state and a contracted state, wherein said locking ring accommodates engagement of said spigot ring and said bell ring in said expanded state, and wherein said locking ring clamps said bell ring and said spigot ring in said contracted state;
   a test gasket disposed within said first circumferential groove of said spigot ring;
   a pipe seal gasket disposed within said second circumferential groove of said spigot ring, said test gasket and said pipe seal gasket defining an annular space therebetween; and
   a pressure port in fluid communication with said annular space between said test gasket and said pipe seal gasket;
   wherein said pressure port is accessible from said exterior surface of said spigot ring, the testable joint further comprising a conduit disposed between and in fluid communication with said pressure port and said annular space between said test gasket and said pipe seal gasket.

4. A spigot ring for coupling a first pipe to a second pipe, the second pipe including a bell ring having an interior surface for coupling to the first pipe and a locking ring that is adjustable between expanded and contracted states, the spigot ring comprising:
   an annular spigot body having an exterior surface and an interior surface and defining a passage for transporting fluids therethrough;
   a first circumferential groove formed in said exterior surface and configured to receive a test gasket;
   at least one second circumferential groove formed in said exterior surface and configured to receive a pipe seal gasket for sealing the joint between the first pipe and the second pipe, said first circumferential groove and said second circumferential groove defining an annular space therebetween;
an engagement member disposed at a distal end of said spigot body, said engagement member configured to be received within the interior surface of the bell ring and to engage the locking ring when the locking ring is in the contracted state to thereby secure said spigot ring to the bell ring; and
a pressure port in the spigot ring, said pressure port in fluid communication with said annular space between said first circumferential groove and said second circumferential groove.

5. The spigot ring of claim 4, wherein said pressure port is accessible from said interior surface of said spigot body.

6. The spigot ring of claim 4, wherein said pressure port is accessible from said exterior surface of said spigot body, said spigot further comprising a conduit disposed between and in fluid communication with said pressure port and said annular space between said first circumferential groove and said second circumferential groove.

7. A pipe couplable to a pipe system, the pipe system including a bell ring having an interior surface for coupling to the pipe and a locking ring that is adjustable between expanded and contracted states, the pipe comprising:
a pipe section having first and second ends;
at least one spigot ring disposed at one of said first and second ends and configured to be received within the interior surface of the bell ring and to engage the locking ring when the locking ring is in the contracted state to thereby secure said spigot ring to the bell ring, said spigot ring having an interior surface and an exterior surface and defining a passage for transporting fluids therethrough;
a first circumferential groove formed in said exterior surface and configured to receive a test gasket;
at least one second circumferential groove formed in said exterior surface and configured to receive a pipe seal gasket;
a test gasket disposed within said first circumferential groove;
a pipe seal gasket disposed within said second circumferential groove, said test gasket and said pipe seal gasket defining an annular space therebetween; and
a pressure port formed in said spigot ring and in fluid communication with said annular space between said test gasket and said pipe seal gasket.

8. The pipe of claim 7, wherein said pressure port is accessible from said interior surface of said spigot ring.

9. The pipe of claim 7, wherein said pressure port is accessible from said exterior surface of said spigot ring, the pipe further comprising a conduit disposed between and in fluid communication with said pressure port and said annular space.

10. A pipe assembly, comprising:
first and second pipe sections each having first and second ends;
a spigot ring disposed on said first end of said first pipe section, said spigot ring having an interior surface and an exterior surface and defining a passage for transporting fluids therethrough;
a first circumferential groove formed in said exterior surface of said spigot ring and configured to receive a test gasket;
at least one second circumferential groove formed in said exterior surface of said spigot ring and configured to receive a pipe seal gasket;
a bell ring disposed on said second end of said second pipe section and configured to engage said spigot ring, said bell ring having an interior surface sized to receive at least a portion of said spigot ring, said interior surface having a circumferential groove;
a locking ring disposed within said circumferential groove of said bell ring and having a diameter adjustable between an expanded state and a contracted state, wherein said locking ring accommodates engagement of said spigot ring and said bell
ring in said expanded state, and engages said bell ring to said spigot ring in said contracted state;
a test gasket disposed in said first circumferential groove formed in said spigot ring;
a pipe seal gasket disposed in said second circumferential groove formed in said spigot ring, said test gasket and said pipe seal gasket defining an annular space therebetween; and
a pressure port formed in said spigot ring and in fluid communication with said annular space between said test gasket and said pipe seal gasket.

11. A method of testing a pipe assembly having at least first and second pipe sections coupled together by a spigot ring and a bell ring, the spigot ring and bell ring defining a passage for transporting fluids therethrough, the bell ring having a locking ring that contracts to engage the bell ring to the spigot ring, the spigot ring having a pipe seal gasket and a test gasket defining an annular test space therebetween, and a pressure port in the spigot ring and in communication with the annular test space, the method comprising:
coupling a pressure source to the pressure port and the annular test space;
pressurizing the annular test space to test the seal of the pipe seal gasket; and
monitoring the pressure in the annular test space.

12. The method of claim 11, wherein coupling the pressure source to the pressure port includes accessing the pressure port from a location interior to the pipe assembly.

13. The method of claim 11, wherein coupling the pressure source to the pressure port includes accessing the pressure port from a location exterior to the pipe assembly.

14. The pipe joint of claim 1, further comprising an aperture formed in said spigot ring and communicating with said first circumferential groove to facilitate fluid communication between said pressure port and said annular space.

15. The pipe joint of claim 3, wherein said conduit extends along said interior surface of said spigot ring.

16. The spigot ring of claim 4, further comprising an aperture formed in said spigot body and communicating with said first circumferential groove to facilitate fluid communication between said pressure port and said annular space.

17. The spigot ring of claim 6, wherein said conduit extends along said interior surface of said spigot body.

18. The pipe of claim 7, further comprising an aperture formed in said spigot ring and communicating with said first circumferential groove to facilitate fluid communication between said pressure port and said annular space.

19. The pipe of claim 9, wherein said conduit extends along said interior surface of said spigot ring.

20. The pipe assembly of claim 10, further comprising an aperture formed in said spigot ring and communicating with said first circumferential groove to facilitate fluid communication between said pressure port and said annular space.

* * * * *